US006649713B2

United States Patent
Tang et al.

(10) Patent No.: US 6,649,713 B2
(45) Date of Patent: Nov. 18, 2003

(54) PROCESS FOR PREPARATION OF POLYOLEFIN/INORGANIC COMPONENT NANOCOMPOSITE BY IN-SITU POLYMERIZATION

(75) Inventors: Tao Tang, Changchun (CN); Liangming Wei, Changchun (CN); Baolong Huang, Changchun (CN)

(73) Assignee: Changchun Institute of Applied Chemistry Chinese Academy of Science, Jilian (CN)

( * ) Notice: Subject to any disclaimer, the term of this patent is extended or adjusted under 35 U.S.C. 154(b) by 0 days.

(21) Appl. No.: 10/128,948

(22) Filed: Apr. 24, 2002

(65) Prior Publication Data

US 2003/0055148 A1 Mar. 20, 2003

(30) Foreign Application Priority Data

Sep. 17, 2001 (CN) .......................................... 01141982

(51) Int. Cl.[7] ................................................. C08F 4/42
(52) U.S. Cl. ....................... 526/160; 526/943; 526/129; 526/141; 526/348; 502/80; 502/152; 502/123
(58) Field of Search ................................ 526/160, 943, 526/129, 141, 348; 502/80, 152, 123

(56) References Cited

U.S. PATENT DOCUMENTS 5,308,811 A  *  5/1994  Suga et al. .................... 502/62
5,830,820 A  * 11/1998  Yano et al. .................... 502/62

FOREIGN PATENT DOCUMENTS

EP        0 849 292 A1  *  6/1998

* cited by examiner

Primary Examiner—Ling-Siu Choi
(74) Attorney, Agent, or Firm—Pennie & Edmonds LLP

(57) ABSTRACT

The present invention relates to a process for preparation of polyolefin/inorganic component nanocomposite by in-situ polymerization, in which, a clay is first organically modified and then silica or titanium dioxide nanometer particles are incorporated into the layers of crystal sheets of the clay by sol-gel method. And a metallocene catalyst is then loaded on the above-mentioned material and a finished catalyst is obtained. The said catalyst is used for in-situ polymerization of ethylene or propylene, and polyolefin/clay nanocomposite is finally obtained. The process for preparation of the catalyst according to the present invention is simple, and the mechanical properties of the nanocomposite are high. For example, the Young's modulus and the tensile strength thereof are in the ranges of 700–2600 Mpa, and 20–55 MPa respectively.

7 Claims, No Drawings

PROCESS FOR PREPARATION OF POLYOLEFIN/INORGANIC COMPONENT NANOCOMPOSITE BY IN-SITU POLYMERIZATION

FIELD OF THE INVENTION

The present invention relates to a process for the preparation of polyolefin/inorganic component nanometer-composite(the "nanomneter-composite" herein is abbreviated to "nanocomposite" thereinafter) by in-situ polymerization, more particularly, to a process for the preparation of a tertiary component nanocomposite consisting of silica (or titanium dioxide), layered metal compound and polyolefin.

BACKGROUND OF THE INVENTION

It is well known that the properties of conventional polymers can be improved by addition of certain inorganic components. In general, the inorganic components in the polymeric material are difficult to be homogeneously dispersed and will separate out after a relatively long time, thus both largely deteriorating the comprehensive properties of the material.

If the dispersion of the inorganic component in the polymeric materials approaches nanometric scale, mechanical propertics, thermal stability, gas permeability, optical properties, self-extinguishing characteristics and the like of the nanocomposite will be greatly improved without degrading the properties of the pure polymeric material even when the proportion of the inorganic component is very low, for example, less than 5% by weight.

Examples of inorganic component of nanometer size in an organic/inorganic nanocomposite include nanometer ball-shape in all three dimensions such as nanometer granules, or nanometer size in two dimensions such as whiskers, and nanometer size sheet structure such as layered metal compounds. Polymeric materials using layered metal compounds as the nanometer component can be obtained by the following three methods:

1) exfoliation adsorption method—An aqueous solution of water soluble polymer molecules interacts with inorganic layers of nanometer size in complete exfoliated form to form a composite;
2) melt intercalation—Polymer in molten state is intercalated under external stress into interlayer gaps of the modified layered metal compound to form a nanocomposite;
3) in-situ polymerization—Monomer or catalyst is adsorbed in the gaps of the layered metal compound and then is polymerized in the gaps, as a result, the inorganic component is homogeneously dispersed in the polymer matrix.

DESCRIPTION OF THE INVENTION

The object of the present invention is to provide a process for the preparation of a polyolefin/inorganic component nanocomposite by in-situ polymerization. According to the present method, silica or titanium dioxide particles are assembled in the gaps of the layered metal compound by sol-gel method; sequentially, metallocene catalyst is loaded, and then olefine(s) is(are) in-situ polymerized. Nanocomposites filled with layered metal compound and spherical or sphere-like nanometer inorganic component are finally obtained. The distance between the layers is thus increased due to the incorporation of silica or titanium dioxide nanometer particles into the gaps between layers of the layered metal compound, so it is easier for metallocene catalyst to enter the gaps of the layered metal compound. At the same time, abundant hydroxyl groups on the intercalated silica or titanium dioxide particles could further raise the amount of the metallocene catalyst loaded. Since the said layered metal compound possesses larger interlayer distance and suitable passages, ethylene monomer could diffuse freely into the gaps to contact with the metal ions on the catalyst centers. Large amount of heat generated in the polymerization helps the silica or titanium dioxide particles to disperse homogeneously at nanometer level in the polyolefin matrix.

According to the present invention, layered metal compound is firstly mixed with water to form an aqueous suspension of 0.5%–10% by weight, and the resulting suspension is then mixed with an aqueous solution of a long-chain alkyl ammonium salt in an amount of 1–2 times of exchange value of the layered metal compound by weight to form a layered organo-metal compound, and the resulting compound is then dried in air at room temperature for 10–40 h, where, the layered metal compound is montmorillonite or vermiculite, and the long-chain aliphatic ammonium salt is hexadecyl trimethyl ammonium bromide or decyl trimethyl ammonium bromide, and the water used is deionized water by ion exchange. To the dried organo-metal compound is added aliphatic amine and the resulting mixture is stirred at 10–50° C. for 20–60 min, wherein the mole ratio of layered organo-metal compound and aliphatic amine is in the range of 1:2–20, and the aliphatic amine used is $C_6H_{13}NH_2$, $C_8H_{12}NH_2$, $C_{10}H_{21}NH_2$ or $C_{12}H_{25}NH_2$. Then silica or titanium dioxide precursor is added into the aliphatic amine-treated layered organo-metal compound and the resulting mixture is stirred at 10–50° C. for 3–6 h; the mole ratio of the precursor and aliphatic amine is 8–10:1. The precipitate is collected, dried at room temperature for 12–24 h and then dried at 100–300° C. 10–30 ml/g of alkyl aluminum or alkoxy aluminum is added under inert gas atmosphere into the dried product and treated at 20–80° C. for 12–24 h, the treated product is then washed with inert hydrocarbon solvent to remove the excess alkyl aluminum or alkoxy aluminum, silica or titaniumn dioxide precursor is tetraethyl orthosilicate, tetramethyl orthosilicate, tetraethyl orthotitanate, tetrabutyl orthotitanate, or methyl triethoxy silane, the inert organic solvent is toluene, hexane, heptane or petroleum ether. To the treated product, toluene solution of metallocene catalyst (19.38 mmole) is added at 20–80° C., the added quantity being 10–40 ml for each gram of the carrier. The unloaded metallocene catalyst is removed by washing with toluene. The loaded catalyst is put into polymerization vessel followed by introducing ethylene or propylene monomer, wherein alkyl aluminoxane is used as the co-catalyst to carry out the olefin polymerization. HCl solution of ethanol is used to terminate the reaction.

Polyolefin nanocomposite filled jointly by layered metal compound and nanometer level silica or titanium dioxide can be prepared by the method according to the present invention. Due to the synergistic enhancement effect of the two kinds of nanometer particles, the mechanical properties of the polyolefin materials thus obtained will be greatly increased even if the content of the inorganic component is extremely low. In addition, the method for preparation of the catalyst is simple and the mechanical properties of the nanocomposite is high. Young's modulus of the nanocomposite is in the range of 700–2600 MPa, while the tensile strength is in the range of 20–55 MPa.

DETAILED EMBODIMENTS OF THE INVENTION

EXAMPLE 1

10 gram of Na-type montmorillonite (Kunipia. Co.)is added to 1000 ml deionized water, the mixture is stirred at 80° C. for 12 h and left overnight. After the sediment of the suspension is removed, 8.5 g of hexadecyl trimethyl ammonium bromide is added. The resulting suspension is stirred at 80° C. for more than 4 h. After filtration, the excess hexadecyl trimethyl ammonium bromide is washed away by deionized water. The filtrate is dried at room temperature for 48 h.

2 g of the dried product is added to 12.6 g dodecyl amine, and the mixture is stirred for 30 min. After addition of 95 g of tetraethyl orthosilicate, the mixture is stirred at room temperature for 5 h. The reaction product is centrifuged. The precipitate is taken out and dried in air for 12 h and then in vacuum at 150° C. for 15 h. It is left for further use.

To 1.0 g of the above said precipitate, 20 ml toluene and 20 ml methyl aluminoxatie (MAO) are added. The mixture is stirred at 50° C. for 24 h. The excess MAO is washed away with toluene, and then 4 ml of toluene solution of dichlorozircocene (dichlorodicyclopentadienyl zirconium) (19.38 mmol) is added. The reaction is continued for 12 h and the product is left for further use. Excess free dichlorozircocene is washed away with toluene and the sample is dried in vacuum. Loaded catalyst in powder form is obtained. A little amount of the loaded catalyst is taken out to determine the content of zirconium atom in the catalyst by plasma emission spectrum.

0.1 g of loaded catalyst, 150 ml of toluene and 15 ml of MAO co-catalyst (by syringe) are added to a dried polymerization vessel purged three times with ethylene gas. The concentration of MAO is 1.6M (Al/Zr=1000). The ethylene gas is passed in and the polymerization is carried out at 60° C. for more than 1 h. 3.4 g of polyethylene composite is finally obtained. The content of inorganic component in the composite is 3.3% by weight. Young's modulus and tensile strength of the nanocomposite are respectively 897 MPa and 25.7 MPa.

EXAMPLE 2

5 gram of Na-type montmorillonite (Kunipia Co) is added to deionized water to form a 10 wt % suspension. 500 ml of hexadecyl trimethyl ammonium bromide solution(0.85%) is added to the suspension. The mixture is stirred at 80° C. for 12 h. After filtration, the excess hexadecyl trimethyl ammonium bromide is washed away by deionized water. The filtrate is dried at room temperature for 24 h.

The said dried filtrate is added to 25.01 g decyl amine and stirred for 30 min. Then 281 g of tetra methyl orthosilicate is added and stirred at room temperature for 5 h. The reaction product is centrifuged. The precipitate is taken out and dried in air for more than 12 h and in vacuum at 150° C. for 15 h. It is left for further use.

0.1 g of the said dried precipitate is taken out and catalyst is loaded on it. They are used in the polymerization. The succeeding processes are identical to those in Example 1. The final yield of composite is 3.8 g and its content of inorganic component is 2.6 wt %. The nanocomposite has a Young's modulus of 1160 MPa and a tensile strength of 27.5 MPa.

EXAMPLE 3

Example 3 is carried out in the same manner as in Example 2 except that the organo-montmorillonite is dried at room temperature for 12 h. The final yield of composite is 4.1 g and its content of inorganic component is 2.4 wt %. The nanocomposite has a Young's modulus of 1230 MPa and a tensile strength of 28.4 MPa.

EXAMPLE 4

The method of preparation for carrier is similar to that of Example 1 except that the aliphatic amine used is n-hexyl amine, the amount of zircocene solution added in loading the zircocene is 6 ml and the amount of MAO is correspondingly raised (Al/Zr=1000). The final yield of composite is 4.5 g and its content of inorganic component is 2.2 wt %. The nanocomposite has a Young's modulus of 1020 MPa and a tensile strength of 35.7 MPa.

EXAMPLE 5

The method of preparation for carrier is identical with that of Example 1 except that the amount of zircocene solution added in loading the zircocene is 8 ml and the amount of MAO is correspondingly raised to Al/Zr=1000. The final yield of composite is 3.5 g and its content of inorganic component is 2.9 wt %. The nanocomposite has a Young's modulus of 2570 MPa and a tensile strength of 54.3 MPa.

EXAMPLE 6

0.1 g of Na-type montmorillonite is dried in vacuum at 250° C. for 12 h. 3 ml of MAO is added to it under the protection of argon and stirred at 50° C. for 12 h, the excess MAO is washed away with toluene. 5 ml of zircocene catalyst solution (19.38 mmol) is added to it and the reaction is carried our at 50° C. for 12 h. The excess free zircocene catalyst is washed away with toluene and the sample is dried to dryness at reduced pressure. Loaded catalyst in powder form is finally obtained. The catalyst is put into the polymerizing vessel and 100 ml of toluene and 20 ml of co-catalyst MAO, Al/Zr=1000 are added. Ethylene monomer is then passed in to carry out the polymerization. The final yield of composite is 3.7 g and its content of inorganic component is 2.7 wt %. The nanocomposite has a Young's modulus of 784 MPa and a tensile strength of 24.1 MPa.

EXAMPLE 7

0.1 g of organo-montmorillonite whose method of preparation is identical with that of Example 1 is dried in vacuum at 250° C. for 12 h. 20 ml of MAO is added to it under the protection of argon and stirred at 50° C. for 12 h, the excess MAO is washed away with toluene. 8 ml of zircocene catalyst solution (19.38 mmol) is added to it and reacted at 50° C. for 12 h. The excess free zircocene catalystis washed away with toluene. Loaded catalyst in powder form is finally obtained. The polymerization process and steps are identical to those in Example 1. The final yield of composite is 2.6 g and its content of inorganic component is 3.8 wt %. The nanocomposite has a Young's modulus of 710 MPa and a tensile strength of 32.0 MPa.

EXAMPLE 8

The method of preparation is similar to that of Example 1 except that the silica precursor is tetra ethyl orthosilicate and methyl triethoxy silane with their mole ratio at 1:1. The amount of loaded zirconium on the catalyst is 6.3 mg/g. The final yield of composite is 3.4 g and its content of inorganic component is 3 wt %. The nanocomposite has a Young's modulus of 2060 MPa and a tensile strength of 471 MPa.

EXAMPLE 9

10 gram of vermiculite is added to 1000 ml deionized water, the mixture is stirred at 80° C. for 12 h and left overnight. After the sediment of the suspension at the bottom is discarded, 20 g of decyl trimethyl ammonium bromide is added, the suspension is stirred at 50° C. for 12 h. After filtration, the excess decyl trimethyl ammonium bromide is washed away by deionized water. The filtrate is dried at room temperature.

2 g of the said dried filtrate is added to 4.2 g dodecyl amine and stirred for 45 min. 47.2 g of tetra ethyl orthosilicate is then added and stirred at room temperature for 12 h. The reaction product is centrifuged. The precipitate is dried in air for more than 12 h and in vacuum at 150° C. for 18 h. It is left for further use.

To 1.0 g of the above said precipitate, 20 ml toluene and 20 ml methyl aluminoxane (MAO) is added, stirred at 50° C. for 24 h, the excess MAO is washed away with toluene, 8 ml of toluene solution of dichiorozircocene (dichiorodicyclopentadienyl zirconium) (38.76 mmol) is then added, and reacted for 12 h. The product is left for further use.

The excess free dichlorozircocene is washed away with toluene and dried in vacuum. Loaded catalyst in powder form is obtained. 0.1 g of loaded catalyst is added to a dried polymerizing vessel already purged three times with ethylene gas, then 150 ml n-hexane and 15 ml MAO co-catalyst (by syringe) are added. The concentration of MAO is 1.6M (Al/Zr =1000). Ethylene gas is passed in and polymerized at 30° C. for 1 h. 3.8 g of polyethylene composite is finally obtained. The content of inorganic component in the composite is 2.6 wt %. Young's modulus of the nanocomposite is 2016 MPa and its tensile strength is 35.4 MPa.

EXAMPLE 10

Dodecyl amine and tetra ethyl orthosilicate are used to treat the organo-clay with a method identical to that of Example 9. The sample is dried in vacuum at 100° C. for 4 h. To 2.0 g of the above said reactant, 20 ml of triethyl aluminum is added and reacted at 20° C. for 5 h. The excess triethyl aluminum is washed away with n-heptane. 4 ml of dichlorozircocene (19.38 mmol) is added and reacted at 20° C. for 12 h. The excess free dichliorozircocene is washed away with n-heptane and a loaded catalyst is obtained. Loaded catalyst is used to polymerize ethylene with n-heptane as the solvent. Polymerization method used is identical to that of Example 9. 2.6 g of polyethylene composite is finally obtained. The content of inorganic component in the composite is 3.8 wt %. Young's modulus of the nanocomposite is 894 MPa and its tensile strength is 27.4 MPa.

EXAMPLE 11

10 gram of Na-type montmorillonite is added to 1000 ml deionized water, the mixture is stirred at 80° C. for 12 h and is left overnight. 8.5 g of hexadecyl trimethyl ammonium bromide is added to the supernatant liquid, the suspension is stirred at 50° C. for 12 h. After filtration, the excess ammonium salt is washed away with a mixture of ethanol and deionized water (v/v=1:1) and organo-clay is obtained. The said organo-clay is once again suspended in deionized water and once again filtered. The filtrate is dried at room temperature to constant weight. 2 g of the said dried organo-montmorillonite is added to 7.13 g decyl amine and stirred at 50° C. for 30 min. Then 103.4 g of tetra ethyl orthotitanate is added and stirred vigorously for 18 h. The precipitate is separated by centrifugation and is dried in air for 18 h. The dried precipitate is loaded with dichlorozircocene according to Example 9. The loaded catalyst is used to polymerize ethylene as in Example 9 and 4.1 g of the final product is obtained. The nanocomposite has a inorganic component content of 2.4%, Young's modulus of 2190 MPa and tensile strength of 41.1 MPa.

EXAMPLE 12

The method of preparation of organo-clay and its treatment with dodecyl amine, tetra ethyl orthotitanate are identical with those of Example 11 except that main catalyst loaded is 7 ml of $Et(Ind)_2ZrCl_2$ (19.00 mmol) and the monomer used is propylene. 2.5 g of polypropylene composite is finally obtained. The content of inorganic component in the composite is 4.0 wt %. Young's modulus of the nanocomposite is 2280 MPa and its tensile strength is 43.1 MPa.

EXAMPLE 13

The method of preparation of organo-clay is identical to that of Example 11. 12.6 g of dodecyl amine is added to 2 g of organo-clay dried in air at room temperature, stirred at 50° C. for 45 min, then 141.6 g of tetra ethyl orthosilicate is added, stirred vigorously for 12 h and centrifuged. The sediment is dried in air for 2 days and in vacuum at 150° C. for 12 h. Under the protection of argon atmosphere, the dried sample is treated with MAO followed by catalyst loading. Experimental method is identical to that of Example 12 except that the amount of $Et(Ind)_2ZrCl_2$ (19.00 mmol) used is 10 ml. 2.7 g of polypropylene composite is finally obtained. The content of inorganic component in the composite is 3.7 wt %. Young's modulus of the nanocomposite is 2430 MPa and its tensile strength is 49.7 MPa.

EXAMPLE 14

The method of preparation of organo-clay is identical to that of Example 11. 16.8 g of dodecyl amine is added to organo-clay dried in air at room temperature, stirred at 50° C. for 45 min, then 188.8 g of tetramethyl orthosilicate is added, stirred vigorously for 12 h and centrifuged. The sediment is dried in air for 2 days and in vacuum at 150° C. for 12 h. The dried sample is treated at 35° C. with 30 ml of MAO (1.6M) for 12 h followed by washing with toluene to remove the excess MAO. Then 4 ml of dichlorozircocene solution (19.38 mmol) and 30 ml of n-heptane are added and reacted at 50° C. for 12 h. The excess free catalyst is washed away with toluene. After drying, loaded catalyst is obtained. 0.1 g of the loaded catalyst is used in the polymerization of ethylene with n-heptane as the solvent. 3.7 g of polyethylene composite is finally obtained. The content of inorganic component in the composite is 2.7 wt %. Young's modulus of the nanocomposite is 1370 MPa and its tensile strength is 30.4 MPa.

EXAMPLE 15

The method of preparation of organo-clay is identical to that of Example 11. 4.6 g of hexyl amine is added to organo-clay dried in air, stirred at 30° C. for 30 min, then 94.4 g of tetra ethyl orthosilicate is added, stirred vigorously for 12 h and centrifuged. The sediment is dried in air for 24 h. 2 g of the dried sample is dried at 300° C. in vacuum for 12 h. 15 ml of dichlorozircocene solution (19.38 mmol) is added and reacted at room temperature for 18 h. The excess free zircocene is washed away with petroleum ether. After drying, loaded catalyst is obtained. Under the protection of argon atmosphere, 0.2 g of the loaded catalyst with MAO as the co-catalyst (Al/Zr=1000) is used, ethylene is passed in for polymerization and at the same time $H_2$ is used to adjust the molecular argon. 35 g of polyethylene composite is finally obtained. The content of inorganic component in the composite is 2.9 wt %. Young's modulus of the nanocomposite is 2670 MPa and its tensile strength is 55.6 MPa.

EXAMPLE 16

The method of preparation of organo-clay and its treatment with alkyl amine, and tetra ethyl orthotitanate are identical to those of Example 15 except that method for loading the main catalyst is as follows: 3 ml of zircocene (19.38 mmol) is added to 2 g of the organo-clay carrier and reacted at room temperature for 30 min. 20 ml of MAO (1.6M) is mixed and reacted at room temperature for 1 h. The mixture is added to 2 g of the organo-clay carrier to react at room temperature for 12 h and is finally dried. To 0.1 g of the said dried catalyst, ethylene monomer is passed in to carry out the polymerization. Hydrogen is used to adjust molecular weight. 4.1 g of polyethylene nanocomposite is obtained. The content of inorganic component in the composite is 2.4 wt %. Young's modulus of the nanocomposite is 2410 MPa and its tensile strength is 52.9 MPa.

What is claimed is:

1. A process for preparation of a nanocomposite comprising a polyolefin component and inorganic components by in-situ polymerization, comprising:

a) preparation of a layered organo-metal compound: a layered metal compound is mixed with deionized water to form an 0.5 wt %–10 wt % aqueous suspension, the suspension is then mixed with an aqueous solution of a long-chain alkyl ammonium salt in deionized water to form the layered organo-metal compound which is then dried in air at room temperature for 10–40 h, in which the amount of the long-chain alkyl ammonium salt is, 1–2 times exchange value of the layered metal compound in weight ratio;

b) treatment of layered organo-metal compound with aliphatic amine: to the dried layered organo-metal compound, an aliphatic amine is added and the mixture is stirred at 10–50° C. for 20–60 min, the mole ratio of the layered organo-metal compound and the aliphatic amine is in the range of 1:2–1:20;

c) filling silica or titanium dioxide precursor into the aliphatic amine-treated layered organo-metal compound: the silica or titanium dioxide precursor is added into the layered organo-metal compound treated with aliphatic amine, and the mixture is stirred at 10–50° C. for 3–6 h, in which the mole ratio of the precursor and aliphatic amine is 8:1–10:1; the precipitate is collected, and then dried in air at room temperature for 12–24 h and dried again at 100–300° C.;

d) to the dried product said above, 10–30 ml/g of alkyl aluminum or alkoxy aluminum is added under the atmosphere of an inert gas and treated at 20–80° C. for 12–24 h, the treated product is then washed with inert hydrocarbon solvent to remove the excess alkyl aluminum or alkoxy aluminum, thus a catalyst carrier is obtained;

e) loading metallocene catalyst into the carrier: to the resulting carrier, a solution of metallocene catalyst in toluene is added at 20–80° C. in an amount of 10–40 ml for each gram of the carrier, and the unloaded metallocene catalyst is washed away by toluene;

f) olefin polymerization: the loaded catalyst prepared above is put into a polymerization vessel and ethylene or propylene monomer is passed in, alkyl aluminoxane is used as the co-catalyst to carry out the olefin polymerization at 60° C., a solution of HCl in ethanol is used to terminate the reaction.

2. The process according to claim 1, wherein the said layered metal compound is montmorillonite or vermiculite.

3. The process according to claim 1, wherein the long-chain aliphatic ammonium salt is hexadecyl trimethyl ammonium bromide or decyl trimethyl ammonium bromide.

4. The process according to claim 1, wherein the said aliphatic amine is selected from the group consisting, of $C_8H_{12}NH_2$, $C_{10}H_{21}NH_2$, and $C_{12}H_{25}NH_2$.

5. The process according to claim 1, wherein the silica or titanium dioxide precursor is selected from the group consisting of tetraethyl orthosilicate, tetramethyl orthosilicate, tetraethyl orthotitanate, tetra butyl orthotitanate and methyl triethoxy silane.

6. The process according to claim 1, wherein the inert organic solvent is selected from the group consisting of toluene, n-hexane, n-heptane and petroleum ether.

7. The process according to claim 1, wherein the metallocene catalyst is dichlorozircocene.

* * * * *